United States Patent
Peters

(10) Patent No.: US 8,350,768 B2
(45) Date of Patent: Jan. 8, 2013

(54) MULTI-LAYER FILM ELEMENT

(75) Inventor: John Anthony Peters, Au/Schweiz (CH)

(73) Assignee: Leonhard Kurz Stiftung & Co. KG, Furth (DE)

( * ) Notice: Subject to any disclaimer, the term of this patent is extended or adjusted under 35 U.S.C. 154(b) by 335 days.

(21) Appl. No.: 12/663,982

(22) PCT Filed: Jun. 2, 2008

(86) PCT No.: PCT/EP2008/004361
§ 371 (c)(1),
(2), (4) Date: Jan. 13, 2010

(87) PCT Pub. No.: WO2008/151738
PCT Pub. Date: Dec. 18, 2008

(65) Prior Publication Data
US 2010/0182211 A1    Jul. 22, 2010

(30) Foreign Application Priority Data
Jun. 13, 2007   (DE) .................. 10 2007 027 838

(51) Int. Cl.
*H01Q 1/00* (2006.01)

(52) U.S. Cl. .................................... 343/730
(58) Field of Classification Search .......... 343/730, 343/702, 700 MS; 29/600
See application file for complete search history.

(56) References Cited

U.S. PATENT DOCUMENTS

| 5,638,080 | A | 6/1997 | Orthmann et al. |
| 7,289,066 | B2 * | 10/2007 | Homolle et al. ....... 343/700 MS |
| 7,834,818 | B2 * | 11/2010 | Seemann et al. .............. 343/909 |
| 8,077,114 | B2 * | 12/2011 | Lehnberger et al. .......... 343/895 |
| 2001/0018796 | A1 * | 9/2001 | Lee et al. ......................... 29/830 |
| 2006/0053286 | A1 | 3/2006 | Schaengold |
| 2008/0120835 | A1 * | 5/2008 | Caletka et al. .................. 29/852 |
| 2008/0259416 | A1 | 10/2008 | Peters et al. |
| 2009/0128445 | A1 * | 5/2009 | Seemann et al. .............. 343/909 |

FOREIGN PATENT DOCUMENTS

| DE | 19601358 | 7/1996 |
| DE | 4345473 | 3/2006 |
| EP | 1179811 | 2/2002 |
| EP | 1365451 | 11/2003 |
| EP | 1748382 | 1/2007 |
| WO | WO03077620 | 9/2003 |
| WO | WO2006061171 | 6/2006 |

* cited by examiner

*Primary Examiner* — Huedung Mancuso
(74) *Attorney, Agent, or Firm* — Hoffmann & Baron, LLP

(57) ABSTRACT

The invention concerns a multi-layer film element (1) and a process for the production of such a film element. The multi-layer film element (1) has at least one flexible dielectric layer (16) and one or more electrically conductive layers (15, 17) each comprising an electrically conductive material. The layer thickness of the electrically conductive layer or layers is in each case less than 20 μm. The electrically conductive layer or layers are shaped in pattern form for forming two or more conductor structures which are coupled together to afford an antenna structure galvanically connected to an electric circuit (19).

32 Claims, 9 Drawing Sheets

MULTI-LAYER FILM ELEMENT

This application claims priority based on an International Application filed under the Patent Cooperation Treaty, PCT/EP2008/004361, filed on Jun. 2, 2008 and German Application No. DE 102007027838.3-55, filed on Jun. 13, 2007.

BACKGROUND OF THE INVENTION

The invention concerns a multi-layer film element comprising at least one flexible dielectric layer and one or more electrically conductive layers each comprising an electrically conductive material and a process for the production of such a film element.

DE 196 01 358 C2 discloses for example a security document in which a chip is introduced into the paper material of a bank note, the chip having an antenna. For reasons of mechanical stability in that case the chip is laminated onto a carrier which can be a metal foil.

Furthermore EP 1 179 811 A1 describes fixing a security element on the paper carrier of a bank note by means of an adhesive layer, the security element having a substrate layer and a metal layer. In that case the metal layer forms a loop-shaped antenna connected to an integrated circuit. Data stored in the integrated circuit can then be read out by means of that arrangement.

SUMMARY OF THE INVENTION

Now the object of the invention is to provide a multi-layer film element which is inexpensive to produce and from which an item of information can be read out contactlessly by means of electromagnetic waves.

That object is attained by a multi-layer film element comprising at least one flexible dielectric layer and one or more electrically conductive layers each comprising an electrically conductive material, in which the layer thickness of the electrically conductive layers or the electrically conductive layer is respectively less than 20 μm and the electrically conductive layer or the electrically conductive layers is or are shaped in pattern form for forming two or more conductor structures which are coupled together to provide an antenna structure galvanically connected to an electric circuit. In that respect the invention is based on the realization that on the one hand for inexpensive production of such a film element it is necessary to provide the electrically conductive layers as far as possible in a layer thickness which permits inexpensive structuring of such layers, but on the other hand to compensate for a minimization of the possible reading distance which is caused by worsening of the quality factor by virtue of the small layer thickness of the conductive layer by making up the antenna structure from two or more conductor structures which are coupled together. The invention thus achieves the advantage of being able to produce inexpensively and in a roll-to-roll process film elements from which items of information can be read out contactlessly by means of electromagnetic waves, even at a relatively great reading distance. Preferably the layer thickness of the electrically conductive layer is less than 12 μm. In addition by virtue of use of the invention it is also possible to employ electrically conductive layers of a layer thickness of less than 1 μm, which are produced for example by vapor deposition or sputtering.

Advantageous configurations of the invention are set forth in the appendant claims.

In accordance with a preferred embodiment of the invention the two or more conductor structures are shaped in two or more different conductive layers. Thus the multi-layer film element includes for example two electrically conductive layers, wherein a first conductor structure is shaped in the first electrically conductive layer and a second conductor structure is shaped in the second electrically conductive layer. It is also further possible for the multi-layer film element to include three or more electrically conductive layers, in each of which one or more conductor structures are shaped, wherein the conductor structures of the three or more layers are then coupled together to afford the antenna structure galvanically connected to the electric circuit. In that way it is possible to provide a three-dimensional antenna structure preferably formed in a plurality of layer portions, in the same surface region, thereby to improve the quality factor of the antenna structure. In that respect in the simplest case a first and a second planar conductor structure which are separated from each other by way of the dielectric layer are coupled together by way of an electrically conductive pass-through contacting. In that case the first and second conductor structures are preferably structures in coil form which each embrace a conductor track arranged in coil form.

The resonance frequency of an antenna structure galvanically connected to an electric circuit is defined by the equation:

$$f_o = (2\pi)^{-1} \cdot (LC)^{-0.5}$$

wherein

L is inductance, preferably measured in micro-henrys,

C is the total capacitance, preferably measured in pico-farads, and $f_o$ is the resonance frequency, preferably measured in mega-Herz.

The total capacitance C of the antenna structure and the electric circuit (IC) is determined from the following equation:

$$C = C_{IC} + C_{con} + C_c$$

In that equation $C_{IC}$ is the input capacitance of the electric circuit, $C_{con}$ is the connection capacitance between the electric circuit and the antenna structure (usually between 0.5 and 2 pF), and $C_c$ is the interturn capacitance between the turns of the individual coil-form structures (usually between 2 and 4 pF), the capacitance between the conductor structures, the capacitance governed by coupling of the conductor structure and the capacitance governed by the dielectric layer.

The quality factor Q of the antenna structure and the electric circuit (IC) in a parallel circuit determines the minimum magnetic field strength H required to activate the electric circuit and read out an item of information and also determines the maximum reading distance factor D which determines the maximum reading distance from which the information can be read out of the film element.

In that respect the quality factor Q of the antenna structure and the electric circuit (IC) in a parallel circuit is determined as follows:

$$Q = R_p \cdot (C/L)^{0.5}$$

Therein $R_p$ denotes the resistance of the antenna structure and the electric circuit (IC) in a parallel circuit, wherein $$R_p = (R_{pc} \cdot R_{IC})/(R_{pc} + R_{IC}), \text{ and}$$

$$R_{pc} = R_c \cdot (1 + Q_s^2).$$

In that case $R_c$ represents the resistance and $Q_s$ represents the quality factor of the antenna structure.

In that case the quality factor of the antenna structure is determined as follows:

$$Q_s = 2\pi f_o L/R_c$$

In a simple antenna structure made up from a coil-form structure, there are also the following relationships:

$$H = (L \cdot V_{IC}) \cdot (\mu_o \cdot N \cdot S \cdot R_p)^{-1};$$

and $$D = Q \cdot N \cdot S \times 10^{-3}$$

In that respect $V_{IC}$ represents the threshold voltage required to activate the electric circuit; $\mu_o$ is the magnetic permeability constant; N is the number of turns of the coil-form structure and S is the mean surface area surrounding the coil-form structure. Furthermore those parameters influence each other. Thus, while maintaining the mean surface area S, in the case of the very thin metal layers provided here, an increase in the number of turns N leads to a very great increase in the resistance $R_c$, which equally occurs if the area S is increased. With the given boundary conditions, the result of this is that an adequate quality factor Q can no longer be implemented using inexpensive structuring methods for metallic layers by a single coil-form structure. It is however possible in accordance with the preferred embodiment of the invention described here: thus the capacitance $C_c$ is additionally determined by the overlap of the conductive structures of the first and second layers. That capacitance $C_o$ can be approximately determined as follows:

$$C_o = \kappa \cdot \in_o \cdot A/d_s$$

In that equation $\kappa$ is the dielectric constant, approximately between 2.1 and 2.3 for a dielectric layer comprising a polymer material, $\in_o$ is the permeability constant, about $8.9 \times 10^{-12}$ farads/meter, A is the surface in which the first and second conductor structures are arranged in mutually overlapping relationship and $d_s$ is the distance between the first and second electrically conductive layers, which in many situations in use corresponds to the layer thickness of the dielectric layer. Depending on the respective overlap factor the capacitance $C_c$ is thus substantially determined by the capacitance $C_o$.

The invention thus provides a novel degree of freedom, namely the arrangement of the conductor structures relative to each other and coupling of the conductor structures to each other, which makes it possible to achieve a high quality factor in spite of the use of inexpensive structuring methods for the electrically conductive layers.

Thus in a first embodiment of the invention the first and second conductor structures are respectively formed by a coil-form structure and coupled together by means of an electrically conductive pass-through contacting in the form of a series circuit. With that coupling the resistance $R_c$ is admittedly increased, but on the other hand there is a considerable increase, caused by the above-described factors, in the capacitance C and the inductance L, in comparison with a single coil-form arrangement which can be used together with a reduction in the resistance $R_p$ to afford an increase in the overall quality factor Q. In addition it is also possible to achieve further improvements by increasing the number of electrically conductive layers and thus to provide for example three or more electrically conductive layers which provide three or more conductor structures in coil form which—as described above—are coupled together by means of respective pass-through contactings, in a series circuit.

Furthermore it is also possible for the first and second circuit structures to be coupled together by means of pass-through contactings not in a series circuit but in a parallel circuit by means of two electrically conductive pass-through contactings. That also affords considerable advantages as on the one hand the resistance $R_c$ is reduced thereby while on the other hand the capacitance/inductance of the conductor structure can be positively influenced. That is described in greater detail hereinafter.

In accordance with a further preferred embodiment of the invention a third conductor structure is shaped in the first conductive layer and a first electrode of the electric circuit is galvanically connected to the first conductor structure and a second electrode of the electric circuit is galvanically connected to the third conductor structure. Thus two or more conductor structures are formed in the first electrically conductive layer, which are coupled to one or more further conductor structures which are shaped in the second electrically conductive layer. By virtue of the new degrees of freedom afforded thereby, besides making it possible to achieve further improvements in the quality factor, that also permits inexpensive mounting of the electric circuit in and on the film element, while avoiding having to use insulated bridges for a connection for the electric circuit. Thus it is particularly advantageous for the first, second and third conductor structures to be respectively in the form of a coil-form structure, in which case the first conductor structure and the second conductor structure are respectively coupled to the third conductor structure galvanically by way of a pass-through contacting means and/or inductively/capacitively. It is preferred in that respect for an end of the first conductor structure to be galvanically connected by way of a pass-through contacting to an end of the second conductor structure and for an end of the third conductor structure to be galvanically connected by way of a pass-through contacting to the other end of a second conductor structure, thereby affording an antenna structure with a high quality factor and effective and inexpensive coupling of the electronic circuit.

In a further preferred embodiment of the invention the electric circuit is connected galvanically to the first conductor structure but not to the second conductor structure. The first and second conductor structures are thus galvanically separated from each other and coupled together capacitively and/or inductively. In that respect it is possible for the first and second conductor structures to be respectively shaped in the form of coil-form structures and coupled together by a suitable choice of the overlap regions (see above) or by way of special capacitor plates. Furthermore it is also possible for the first conductor structure and the second conductor structure, in particular in this embodiment of the invention, to be formed by two different antenna structures, thus for example with the first conductor structure this involves an antenna coil while with the second conductor structure it involves a dipole antenna, bipole antenna or slot antenna. Thus it can be provided that the first conductor structure is adapted for coupling in the near field, this for example involving an antenna coil or dipole antenna, while the second conductor structure can be formed by an antenna structure adapted for coupling in the far field, thus for example this involving a bipole antenna.

In a further embodiment of the invention it is provided that a first electrode of the electric circuit is galvanically connected to the first conductor structure and a second electrode of the electric circuit is galvanically connected to the second conductor structure and the first conductor structure is otherwise not galvanically connected to the second conductor structure. Thus, in two planes which are displaced in mutually parallel relationship, there are provided two preferably different conductor structures which permit more effective coupling in of the far field.

In a further preferred embodiment of the invention the two or more conductor structures are respectively formed by a conductor track having a first end and a second end, wherein the first ends of the conductor structures are connected to a first electrode of the electric circuit and the second ends of the conductor structures are connected to a second electrode of the electric circuit. The antenna structure is thus formed by two or more conductor structures connected in a parallel circuit.

That provides on the one hand that the resistance $R_c$ is reduced. Furthermore it is thus also possible to influence the capacitance $C_c$ by suitable arrangement of the conductor structures relative to each other, as has already been described hereinbefore for the situation involving arranging the conductor structures in different planes. This advantageous development of the invention thus makes it possible to achieve a marked increase in the quality factor, in particular by the reduction achieved thereby in the resistance $R_c$.

It is further particularly advantageous in that respect if the two or more conductor structures are respectively formed by a conductor track forming a loop-shaped turn and the conductor track of the two or more conductor structures are shaped in the same conductive layer and are arranged in substantially mutually parallel relationship. In this arrangement there is no need for bridging over a conductor track by an electrically insulated bridge and it is in addition also possible to completely dispense with pass-through contacting. This embodiment thus represents a particularly inexpensive and effective variant of the invention.

In this case the turns of the conductor track of the coil-form structures are preferably spaced from each other at between 0.05 mm and 1.0 mm, preferably being spaced from each other at less than 0.5 mm. The width of the coil-form structures is preferably between 0.05 mm and 5 mm.

It has further proven to be advantageous to provide an optically active layer in the film element and in that respect preferably to use the electrically conductive layer or layers as a reflection layer cooperating with the optically active layer. In particular layers with a microscopic or macroscopic surface relief, thin-film layers, liquid crystal layers and layers with optically active pigments are used as the optically active layer. In addition it is possible for the optically active layer to include a coding which can be optically read out and which for example reproduces the information stored in the electronic circuit or is in relationship with that information, for example as a public key for decoding the items of information stored in the electronic circuit.

In a further preferred embodiment of the invention at least one of the electrically conductive layers is formed by a layer of a transfer layer portion of a transfer film connected to the dielectric layer by means of an adhesive layer. By virtue thereof, it is possible for the film element to be built up in a particularly inexpensive fashion: the electrically conductive layers are provided in already pre-structured form in the transfer layer portion of a transfer film and then applied to the dielectric layer by means of a cold or hot embossing operation. In addition it is also possible for the electrically conductive layer to be provided in such a transfer film over the full surface area involved and for structuring of the electrically conductive layer to be effected upon application of the transfer layer portion of the transfer film to the dielectric layer, for example by a suitably shaped embossing stamp or punch or a suitable different, region-wise activation of the adhesive layer of the transfer film. Furthermore it is possible for the dielectric layer itself to be formed by an adhesive layer and/or for the pass-through contactings to be provided in the dielectric layer to be formed by an electrically conductive adhesive.

That makes it possible to achieve further cost savings and it is possible to save on further process steps so that the cost of manufacture is further reduced.

The film element can in addition in turn be in the form of a transfer film, in particular a hot embossing film, and in that case has a carrier film and a transfer layer portion separated therefrom by a release layer. The dielectric layer and the electrically conductive layer or layers are in that case part of the transfer layer portion. The layer thickness of the dielectric layer is here preferably less than 3 μm and the total thickness of the transfer layer portion is preferably a layer thickness of less than 20 μm.

The film element however can also be in the form of a laminating film. In that case the layer thickness of the dielectric layer is preferably between 12 and 42 μm.

The conductive layer is preferably of a layer thickness of less than 12 μm, preferably less than 5 μm. In addition the area covered by the two or more conductor structures is less than 90×50 mm². In that case the two or more conductor structures are preferably provided only in the edge regions of the area defined by the conductor structures, preferably being arranged only in a strip which is less than 4 mm wide and which adjoins the edge region of the defined area.

It is further advantageous for a film element according to the invention to be produced as follows:

The electrically conductive layer is applied already in structured form or over the full surface area involved to a dielectric layer which can also be a multi-layer body, and then structured for example by positive/negative etching, laser ablation or mechanical ablation. In that case the electrically conductive layer is so structured that two or more conductor structures are provided on the surface of the dielectric layer, those structures each forming a respective antenna structure. Preferably those conductor structures are then also electrically conductingly connected together by means of connecting elements which are not disposed in that layer plane. The resulting film body is then folded along a fold line, more specifically so that regions of the surface of the dielectric layer which are not provided with the electrically conductive layer are in contact. The regions which are in contact of the dielectric layer are then glued together, thus affording a film body which is provided on the one side with the one antenna structure and on the other side with the other antenna structure.

BRIEF DESCRIPTION OF THE DRAWINGS

The invention is described by way of example hereinafter by means of a number of embodiments with reference to the accompanying drawings.

DETAILED DESCRIPTION OF THE INVENTION

Figure 1A:
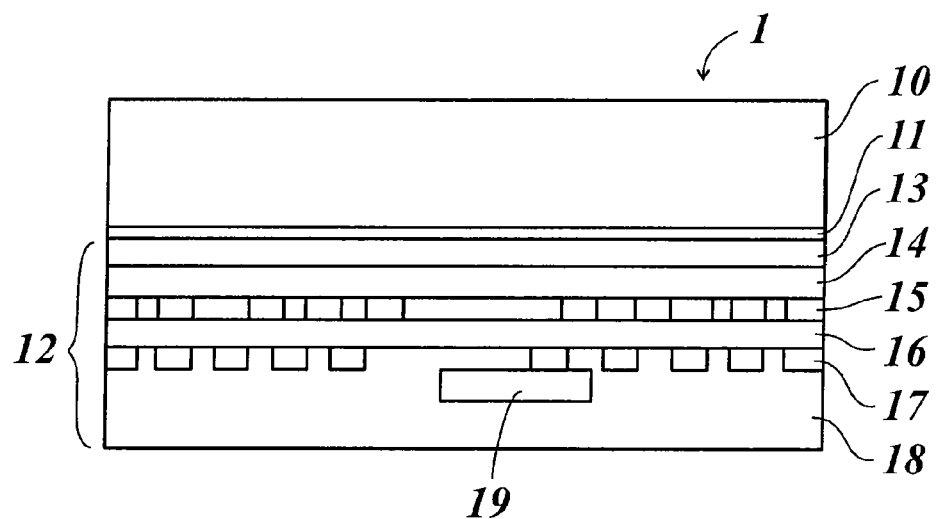
FIG. 1a shows a diagrammatic sectional view of a film element according to the invention for a first embodiment of the invention.

FIG. 1a shows a transfer film 1 comprising a carrier film 10 and a transfer layer portion 12 separated therefrom by a release layer 11.

The carrier layer 10 is formed by a plastic film, preferably a PET, polycarbonate or a BOPP film of a thickness of between 12 and 42 μm. The release layer 11 is a thin layer preferably containing wax-like components, of a thickness of between 0.5 and 1 μm. It is however also possible to dispense with the release layer 11.

The transfer layer portion 12 has a protective layer 13, an optically active layer 14, an electrically conductive layer 15, a dielectric layer 16, an electrically conductive layer 17, an adhesive layer 18 and an electric circuit 19.

The protective layer 13 is a protective lacquer layer of a thickness of between 1 and 5 μm. It is however also possible for the protective layer 13 to be a thin plastic film, in particular a polyester film of a thickness of between 12 and 42 μm, preferably of 20 μm.

The optically active layer 14 is a layer which influences the optical appearance of the embossed film element. In the simplest case the optically active layer 14 is a color lacquer layer which is preferably shaped in a pattern configuration. It is however also possible for the optically active layer 14 to exhibit one or more optically variable effects which serve as additional security features. In that case the optically active layer 14 is preferably of a multi-layer nature.

In a first embodiment the optically active layer 14 is a replication lacquer layer in which an optically active surface relief, in particular a diffractive surface relief, for example a hologram, a microlens structure (microlenses of a diameter of less than 300 μm, in particular less than 50 μm), a matt structure or a blaze grating, is shaped by means of UV replication or by means of a heated embossing punch. In addition it is also possible for the optically active layer 14 to have a thin-film layer system which as a spacer layer has one or more layers of an optically effective thickness of $\lambda/4$ or $\lambda/2$, wherein the $\lambda$ is in the wavelength range of light visible to the human viewer, and thus a color change effect which can be perceived by the viewer is generated by the optically active layer 14. Furthermore it is also possible for the optically active layer 14 to have an oriented and crosslinked liquid crystal layer which for example is oriented differently in various regions, whereby the incident light is differently polarized in various regions. Furthermore it is possible to use a cholesteric liquid crystal material which by virtue of its helical structure also presents a viewing angle-dependent color shift effect.

In addition it is also possible for the optically active layer 14 to contain a binding agent with optically active pigments, in particular effect pigments such as thin-film layer pigments or liquid crystal pigments or UV-active or IR-active luminescent pigments.

The electrically conductive layers 15 and 17 are layers of a metallic, electrically conducting material, for example aluminum, copper, silver, chromium, gold or a metal alloy. It is also possible for the electrically conductive layers 15 and 17 to comprise another electrically conducting material, for example an electrically conductive polymer or a transparent electrically conductive material, for example ITO.

The layer thicknesses of the electrically conductive layers 15 and 17 are preferably greater than 0.1 μm to ensure adequate electrical conductivity. Thus it is possible for example to use a 100 nm thick aluminum layer for antenna structures which are designed for high frequencies (900 MHz or UHF). Investigations have shown that such a layer thickness, with a configuration according to the invention for the film element, are sufficient for coupling in the near field and/or for uses with a short reading distance. The electrically conductive layers 15 and 17 on the other hand are of a thickness of less than 15 μm, preferably less than 5 μm, which permits inexpensive structuring of those layers.

The electrically conductive layers 15 and 17 are further not provided as layers covering the full surface area involved, but are in the form of partially shaped layers, in the transfer layer portion 12, in which case—as indicated in FIG. 1—the electrically conductive layer 15 is shaped in a pattern form to form a first conductor structure and the electrically conductive layer 17 is shaped in a pattern form to form a second conductor structure. The first and second conductor structures are in that case preferably formed by structures in coil or loop form. It is however also possible for the first and second layer structures to be formed by different structures which can be used as antenna structures, and for the electrically conductive layers 15 and 17 thus to be shaped for example in the form of a dipole antenna, a bipole antenna, a patch antenna, an F antenna or a slot antenna.

In production of the transfer film 1 for example the release layer 11 and the optically active layer 13 are successively applied to the carrier film 10. Then the electrically conductive layer 15 is applied over the full surface area involved, for example by a procedure whereby a thin metal layer is applied by vapor deposition or a conducting paste is applied by printing, on the film body formed in that way. The electrically conductive layer 15 is then partially removed again, for example by positive/negative etching, laser ablation or by means of a lift-off process. In addition it is possible for the metal layer to be also galvanically reinforced in a further method step. The dielectric layer 16 is then applied, which for example is a thin lacquer layer of a layer thickness of between 1 and 2 μm. The electrically conductive layer 17 is then in turn applied over the full surface area and then partially removed again by one of the above-described structuring methods so that the second conductor structure is shaped in the electrically conductive layer 17.

Alternatively it is possible for a laminating film with the layers 15, 16 and 17 to be produced separately and then laminated onto the optically active layer 17. For that purpose for example a plastic film, for instance a polymer film of a thickness of between 12 and 24 μm, is used as the dielectric layer 16, that film is provided on both sides with a thin metal layer by vapor deposition and then partially removed again on both sides with one of the above-described structuring methods so that the electrically conductive layers 15 and 17 are shaped in the form of the first and second conductor structures respectively.

Alternatively it is further possible for the electrically conductive layers 15 and/or 17 to be produced in a separate production process (for example structuring by means of a stamping/etching method) and then laminated as part of the transfer layer portion of a transfer film onto the optically active layer 14 or onto the dielectric layer 16 respectively. In that case it is then also possible for the dielectric layer 16 to be formed by an adhesive layer which is provided for the purposes of application of the electrically conductive layer 17 to the film body and thus the layer 16 performs a corresponding dual function.

If required the conductor structures shaped in the electrically conductive layers 15 and 17 are then further coupled together by means of electrically conductive pass-through contacting means through the dielectric layer 16. Those pass-through contacting means are preferably produced by means of an electrically conductive adhesive. In addition it is also possible for the dielectric layer 16 to be only region-wise applied to the electrically conductive layer 15 and for the dielectric layer 16 not to be provided in the regions in which pass-through contacting means are to be provided for coupling the first and second conductor structures. Galvanic coupling of those conductor structures is thus effected automatically upon application of the electrically conductive layer 17.

In the above-described alternative in which a layer configuration consisting of the layers 15, 16 and 17 is produced separately, it is further also possible for holes to be introduced for example by stamping or laser ablation into the dielectric layer 16 by application of the double-sided metalization to the dielectric layer 16 so that—particularly upon galvanic reinforcement of the metal layer during the production process—electrically conductive pass-through contactings are automatically afforded through the dielectric layer 16 in the region of the holes.

Furthermore the electronic circuit is then applied and the second conductor structure is contacted for example by means of an electrically conductive adhesive with the electrodes provided for that purpose of the electric circuit 19.

The electric circuit 19 is preferably a transceiver circuit which is tuned to the resonance frequency of the antenna structure formed by the first and second conductor structures. Preferably in that case the electric circuit 19 does not have an autonomous power source but the power source is afforded by rectification and smoothing of the voltage which is coupled in at the antenna structure by the electromagnetic carrier wave. Communication of the items of information stored in the electric circuit 19 is preferably effected by means of load modulation, the stored information being modulated onto the carrier wave which is reflected back by the antenna structure, in accordance with a predetermined encoding system. The electronic circuit 19 preferably involves a circuit which is constructed on the basis of organic circuit technology using organic semiconductor materials, which is preferably also produced in a roll-to-roll process. In this case the electric circuit 19 can also involve a conventional silicon chip in which a particularly thin silicon wafer is used as the carrier substrate or the carrier substrate has been reduced in thickness prior to application by a mechanical process.

The adhesive layer 18 is then applied over the full surface area involved to the laminate body produced in that way. In that respect the adhesive layer 18 is preferably a thermally activatable adhesive. It is also possible however for the adhesive layer 18 to comprise a cold adhesive or a UV-activatable adhesive.

Figure 1B:
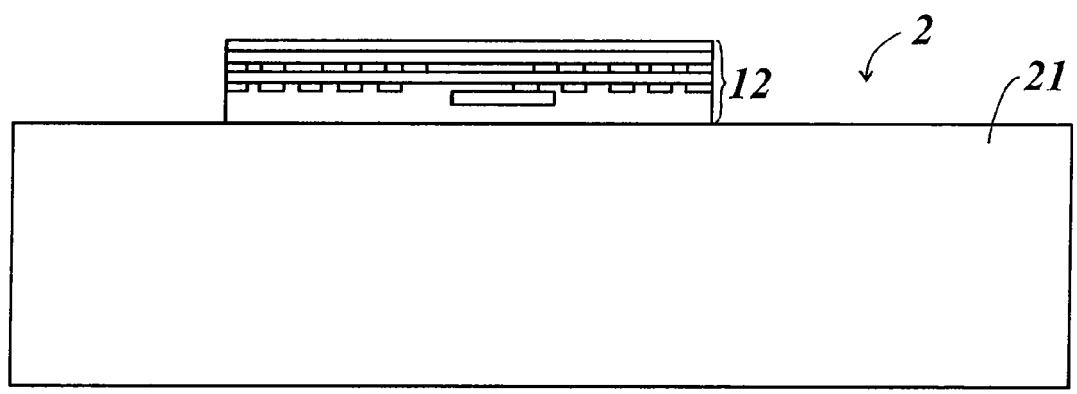
FIG. 1b shows a sectional view of a security document with a film element as shown in FIG. 1a, FIG. 2 shows a diagrammatic sectional view of a film element according to the invention for a further embodiment of the invention.

FIG. 1b shows a security document 2 with a carrier body 21, to which a film element is applied for example by hot embossing, being formed by a subregion of the transfer layer portion 12 of the transfer film 1.

The security document 2 is a bank note, a passport, a driving license or another security document issued by a government authority. Furthermore it is also possible for the security document 2 to involve a software certificate, a credit card and so forth.

The carrier body 21 preferably comprises a paper of a thickness of between 80 and 200 μm. It is however also possible for the carrier body 21 to comprise a polymer carrier material, in particular a polyester film of a thickness of between 24 and 51 μm or a multi-layer plastic and/or paper substrate. In addition it is possible for the carrier body 21 to be printed upon with one or more printed layers in which respect it can be provided that one or more printed layers are provided within the film element formed by the transfer layer portion 12 and/or that film element is partially or entirely overprinted with one or more printed layers. Furthermore it is also possible for film element formed by the transfer layer portion 12 to be applied in a recess introduced into the carrier body 21 by stamping, blind embossing or by means of a watermark.

Furthermore it is also possible for that film element to be laminated in between two or more polymer layers.

Figure 2:
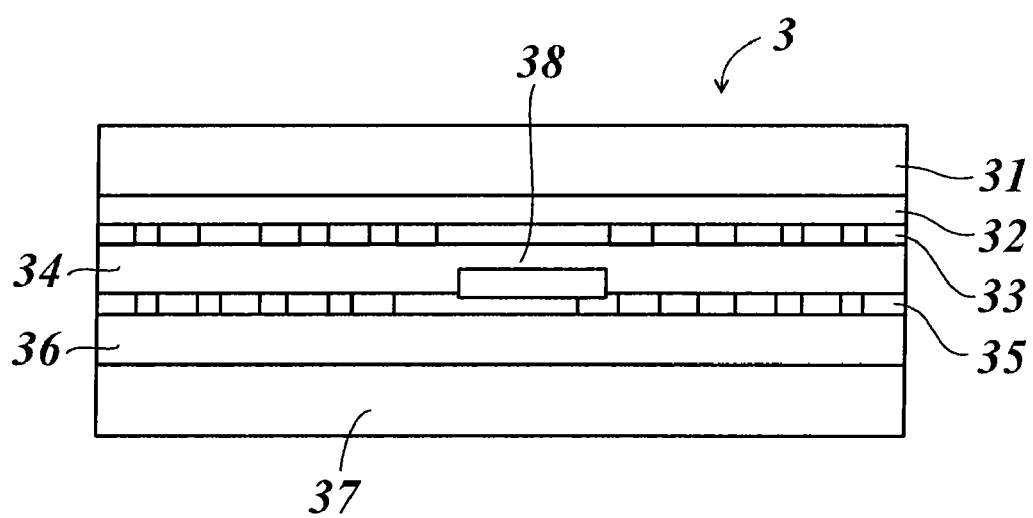

FIG. 2 shows a sectional view which is not true to scale of a film element 3 having a plurality of plastic films 31, 34 and 37, optically active layers 32 and 36, electrically conductive layers 33 and 35 and an electric circuit 37.

To produce the film element 3, in a first step a multi-layer body comprising the electrically conductive layers 33 and 35, the plastic film 34 and the electric circuit 38 is produced.

The plastic film 34 is a film comprising a dielectric plastic material, for example a PET film of a layer thickness of between 24 and 75 μm. As already described hereinbefore with reference to the dielectric layer 16, in the case of the plastic film 34, the electrically conductive layers 33 and 35 are built up, shaped in the form of a first conductor structure and a second conductor structure respectively. In that respect the layers 33 and 35 are constructed in a manner corresponding to the layers 15 and 17 as shown in FIG. 1a and in regard to manufacture and structuring of those layers 33 and 35 attention is directed to the description relating to the layers 33 and 35. Furthermore, a recess is introduced into the plastic layer 34 during or after manufacture of the electrically conductive layers 33 and 35, and the electric circuit 37 can be applied and fixed for example by means of a bonding adhesive layer in the recess during or after manufacture of the electrically conductive layers 33 and 35.

The optically active layers 32 and 36 can be constructed like the optically active layer 14 of FIG. 1a. The optically active layers 32 and 36 are applied as a transfer layer portion of a transfer film either to the plastic film 31 or 37 respectively or to the electrically conductive layer 33 or 35 respectively. The plastic films 31 and 37 preferably involve transparent PET or polycarbonate films of a layer thickness of between 12 μm and 100 μm.

It is also possible for one or both of the electrically conductive layers 33 and 35 also to represent an optically active layer which for example forms an optically perceptible security element.

The partial bodies of the film element 3, which are made up in the above-described manner, are arranged in mutually superposed relationship in the sequence shown in FIG. 2, fed to a laminator and laminated by heat/pressure to give the film element.

Figure 3A:
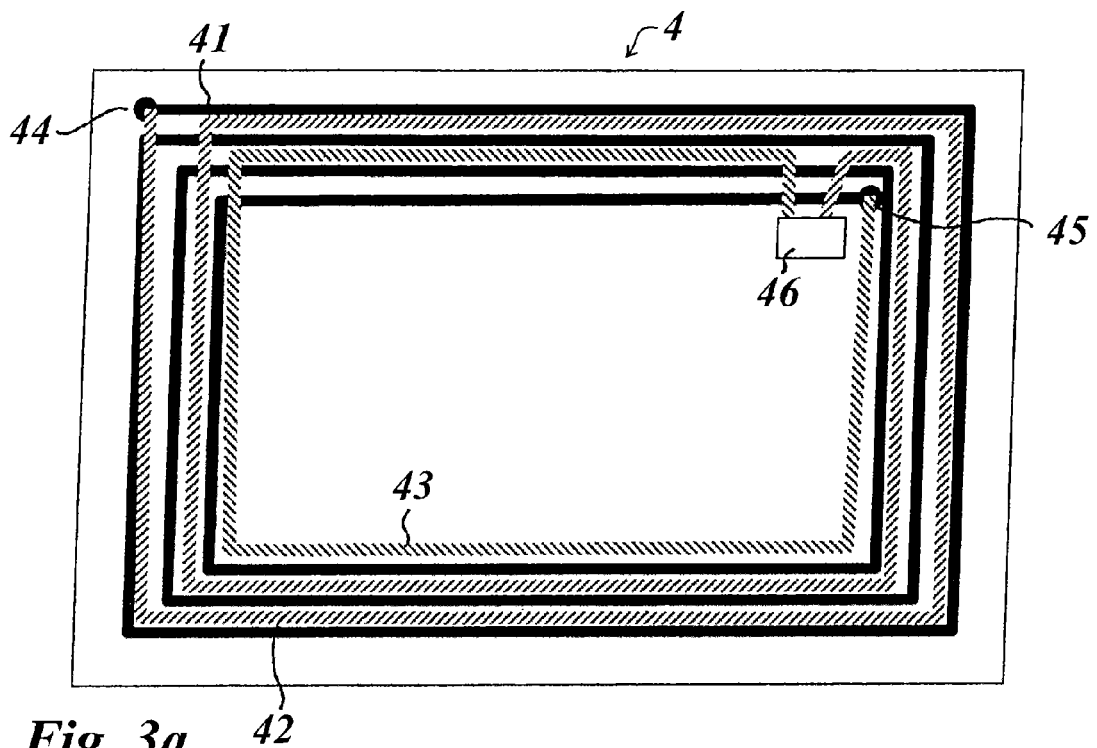
FIG. 3a shows a diagrammatic view of a film element according to the invention in accordance with a further embodiment of the invention.
Figure 3B:
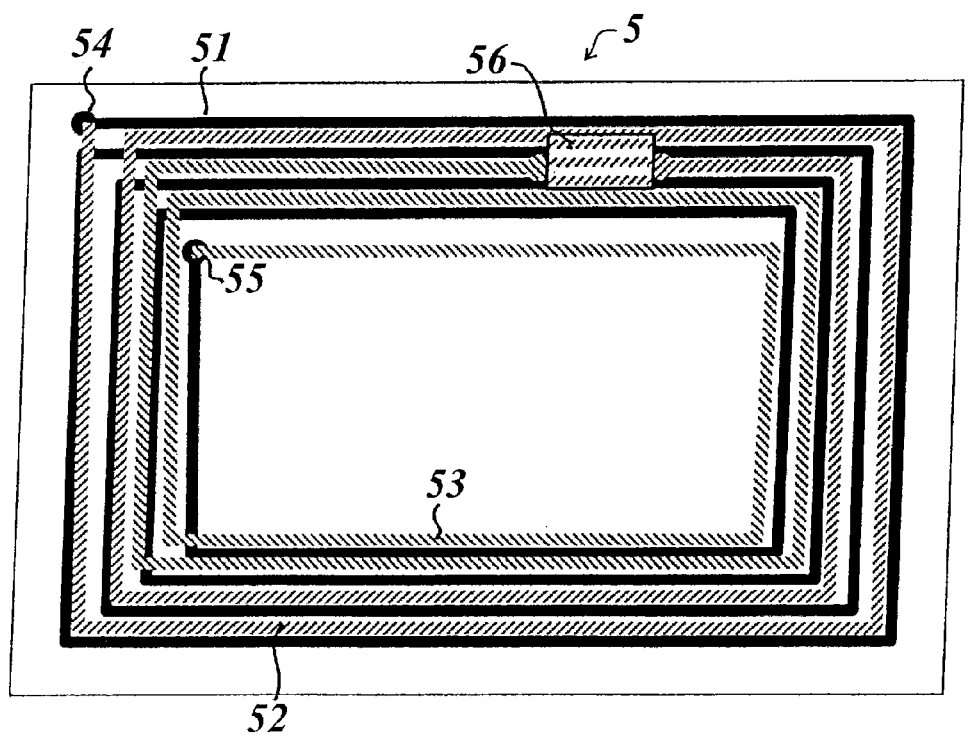
FIG. 3b shows a diagrammatic view of a film element according to the invention for a further embodiment of the invention.

A possible configuration of the first and second conductor structures of the electrically conductive layers 15 and 17 as well as 33 and 35 as shown in FIGS. 1a and 2 respectively is now described more fully with reference to FIGS. 3a and 3b.

FIG. 3a shows a plan view of the film element 4 and shows the formation of mutually superposed electrically conductive layers which are separated by a dielectric layer. Two conductor structures, a conductor structure 42 and a conductor structure 43, are shaped in a first electrically conductive layer. A conductor structure 41 is shaped in a second electrically conductive layer. There are also provided two pass-through contactings 44 and 45. The conductor structure 42 is galvanically connected to the conductor structure 41 by way of the electrically conductive pass-through contacting 44 and the conductor structure 43 is galvanically connected to the conductor structure 41 by way of the electrically conductive pass-through contacting. In addition FIG. 3a shows an electric circuit 46 galvanically connected to the antenna structures formed by the conductor structures 41, 42 and 43. Thus a first electrode of the electric circuit 46 is galvanically connected to the conductor structure 42. The conductor structure 42 is formed by a structure in coil form, the other end of which is galvanically connected to the conductor structure 41 by way of the pass-through contacting 44. The conductor structure 41 is also formed by a structure in coil form, whose other end which is not connected to the pass-through contacting 44 is connected to the conductor structure 43 by way of the pass-through contacting 45. The conductor structure 43 is also formed by a structure which is in coil form but which has only one turn and whose other end which is not connected by way of the pass-through contacting 45 is connected to the other electrode of the electric circuit 46.

In this case the geometrical dimensions and the materials used can be selected by way of example in the FIG. 3a embodiment, as follow:

The dielectric layer used is a polyester film of a thickness of 75 μm, to which a copper layer of a thickness of 12 μm is applied at both sides, which copper layer is structured as described hereinbefore. The outside diameter of the area occupied by the conductor structures 41, 42 and 43 is 76×27 mm. The conductor structures 41, 42 and 43 have 3¼, 1¾ and one turn respectively, as shown in FIG. 3a. The coil-form structures forming the conductor structures 41, 42 and 43 also comprise a conductor track which is arranged in coil form and which is of a width of 0.45 mm and involves a spacing of adjacent turns of the respective conductor track of 0.5 mm. Furthermore at a resonance frequency of 14.5 MHz in the non-loaded state the electric circuit 46 has an input capacitance of $C_{ic}$=14.5 pF. In that respect the arrangement shown in FIG. 3a involves a capacitance $C_c$ of the antenna structure of 8.9 pF, an inductance of the antenna structure L=4.933 μH, with a mean surface area S enclosed by the antenna structure=1767 mm². With a threshold voltage for activation of the electric circuit of $V_{ic}$=2 V the arrangement shown in FIG. 3a thus has the following characteristic:

$Q$=26

$H$=0.062 A/m $D$=280 mm²

Furthermore with the arrangement shown in FIG. 3a there is a capacitance density $C'=\kappa.\in_o/d_s$. If therefore the arrangement of the conductor structures 41 on the one hand and 42 and 43 on the other hand are selected to be different from the view shown in FIG. 3a, the increase caused thereby in the capacitance $C_c$ of the antenna structure can be determined as follows by the increase caused thereby in the capacitance $C_o$:

$C_o = O_f \cdot C' \cdot A$

In that case the overlap factor $O_f$ is afforded from the percentage in accordance with which the conductor tracks of the conductor structures 41, 42 and 43 are arranged in mutually overlapping relationship.

On the basis of the foregoing description the arrangement shown in FIG. 3a can also be adapted to other available area dimensions, layer thicknesses and/or resonance frequencies.

FIG. 3b shows a diagrammatic plan view of a film element 5, based on the view shown in FIG. 3a. Here two conductor structures 52 and 53 are shaped in a first electrically conductive layer and a further structure 51 is shaped in a second electrically conductive layer which is separated from that first layer by way of a dielectric layer. The conductor structure 51 is connected to the conductor structure 52 by way of a pass-through contacting 54 and the conductor structure 51 is connected to the conductor structure 53 by way of a pass-through contacting 55. Here, as shown in FIG. 3b, both conductor structures 52 and 53 which are shaped in the first electrically conductive layer are formed by coil-form structures having a plurality of turns. By virtue thereof it becomes possible for the electric circuit 56 to be galvanically connected in a particularly advantageous manner, while avoiding connection capacitance, to the antenna structure formed by the conductor structures 51, 52 and 53.

Figure 4:
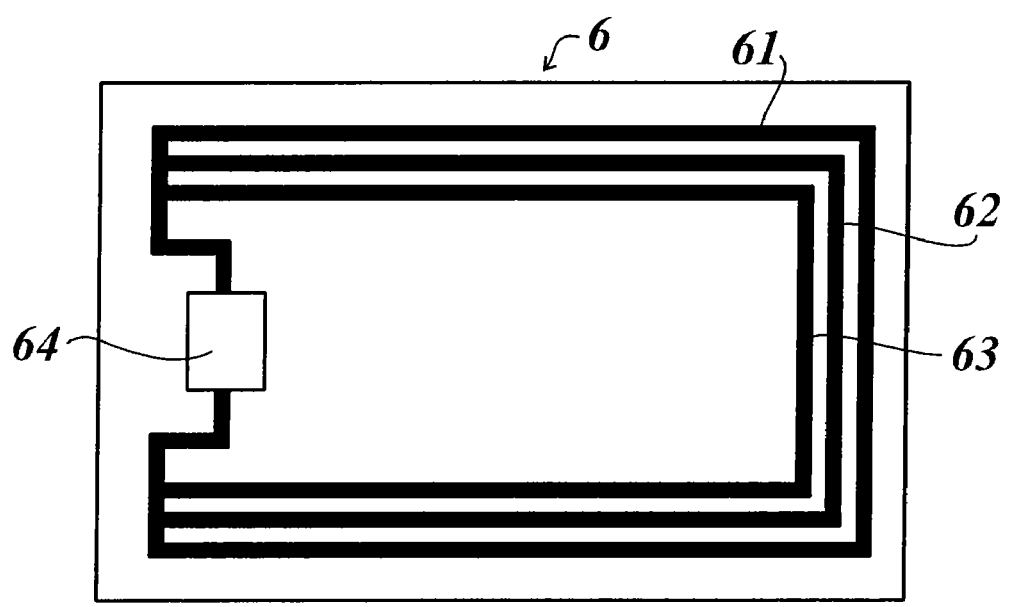
FIG. 4 shows a diagrammatic view of a film element according to the invention for a further embodiment of the invention.

FIG. 4 is a plan view, also based on the view of FIG. 3a, of a film element 6. In this case, in contrast to the film elements 4 and 5, the film element 6 has only one electrically conductive layer in which conductor structures 61, 62 and 63 are shaped. In this case the film element 6 can be configured like the film elements 1, 12 and 3 shown in FIGS. 1a and 1b, with the difference that one of the electrically conductive layers 15, 17 and 33, 35 respectively is not provided. Thus, in regard to the detailed structure of the film element 6, attention is directed to the foregoing description.

As shown in FIG. 4 a respective first end of the conductor structures 61, 62 and 63 is connected to a first electrode of an electric circuit 64 and the second end of the conductor structures 61, 62 and 63 is connected to the other electrode of the electric circuit 64. In this case the conductor structures 61, 62 and 63 are respectively formed by a loop-shaped turn, which are shaped in the same electrically conductive layer and in addition are arranged in substantially mutually parallel relationship.

The conductor structures 61, 62 and 63 in FIG. 4 respectively comprise for example a conductor track of copper of width of 1 mm and a thickness of 1 μm. The spacing between the conductor tracks forming the conductor structures 61, 62 and 63 respectively is 0.5 mm. The outside dimension of the antenna structure which is determined by the outside dimension of the conductor structure 61 is 40 mm×30 mm.

Investigations have now shown that the antenna structures constructed on the basis of the principle shown in FIG. 4 have considerable advantages over comparable "single loop" antennas.

Thus, for a "single loop" antenna of an external dimension of 40 mm×30 mm and comprising a copper conductor track of a width of 3 mm and a thickness of 1 μm the inductance $L_T$ is:

$L_T = L_o + M_+ + M_-$.

Therein $L_o$ represents the self-inductance or the inductance inherent in the conductor track, $M_+$ denotes the positive inductance which arises out of the interaction between adjacent conductor tracks, and $M_-$ represents the reduction in inductance which arises out of destructive magnetic interactions between adjacent conductor tracks.

In the case of a "single loop" antenna of the above-described dimensions the values involved are as follows:

$$L_o=0.10\ \mu H;\ M_+=0;\ \text{and}\ M_-=-0.014,\ \text{or}\ L_T=0.086\ \mu H.$$

If the conductor track comprises pure copper that involves an antenna resistance $R_c$ of 0.73 ohm.

If now the quality factor is determined in accordance with the method described hereinbefore, that affords a quality factor $L_T/R_c$ for the case of the above-discussed "single loop" antenna of approximately 0.118 μH/ohm.

If now the antenna structure of FIG. 3 with the three parallel concentric conductor structures is considered, then that arrangement involves a total inductance of the antenna structure of $L_T$ of:

$$L_T^{-1}=(L_1+M_+'+M_-')^{-1}+(L_2+M_+''+M_-'')^{-1}+(L_3+M_+'''+M_-''')^{-1}$$

Therein $L_1$, $L_2$ and $L_3$ denote the self-inductance of the conductor structures 61, 62 and 63 respectively. Overall therefore the case shown in FIG. 4 involves a total inductance $L_T$=0.114 μH.

The total resistance of the antenna structure of FIG. 4 is calculated from the parallel connection of the resistors of the conductor structures 61, 62 and 63 which respectively involve a resistance $R_1$, $R_2$ and $R_3$.

The following thus applies:

$$R_T^{-1}=R_1^{-1}+R_2^{-1}+R_3^{-1}$$

Thus the antenna structure of FIG. 4 involves a total resistance $R_T$=0.7 ohm and therewith a quality factor $L_T/R_c$=0.163 μH/ohm.

That means that for a predetermined resonance frequency, the quality factor $Q_s$ of the antenna structures can be improved by the use of three concentric conductor structures which as shown in FIG. 4 are internested with each other in a parallel circuit and are connected to the electric circuit 64. Conversely therefore, to achieve the same quality factor, it is possible to reduce the thickness of the conductive layer in which the antenna structures are shaped. Thus in the embodiment of FIG. 4 the thickness of the conductive layer can be reduced to a thickness of 0.118/0.163×1 μm, that is to say approximately 0.75 μm, in comparison with a "single loop" antenna.

Furthermore it is also possible that the conductor structures 61, 62 and 63 are not shaped in one and same electrically conductive layer but that those conductor structures are provided in different layers which are separated from each other by dielectric layers and are coupled together by suitable pass-through contactings corresponding to the view shown in FIG. 4. Attention is directed to the foregoing description for calculation of the capacitance of that arrangement and the options afforded by the possibility of overlapping the conductor structures 61, 62 and 63.

Figure 5:
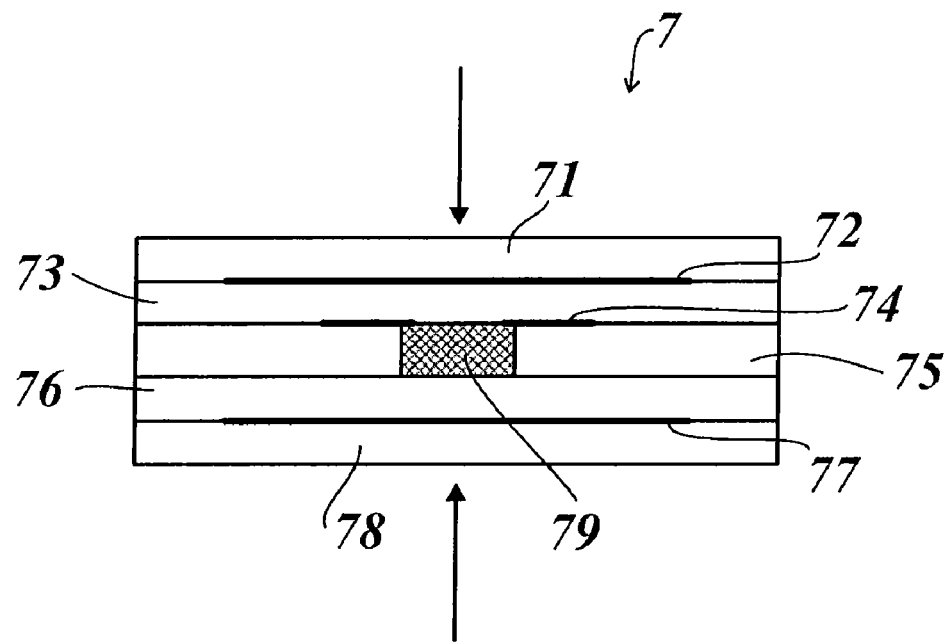
FIG. 5 shows a diagrammatic sectional view of a film element according to the invention for a further embodiment of the invention.
Figure 6:
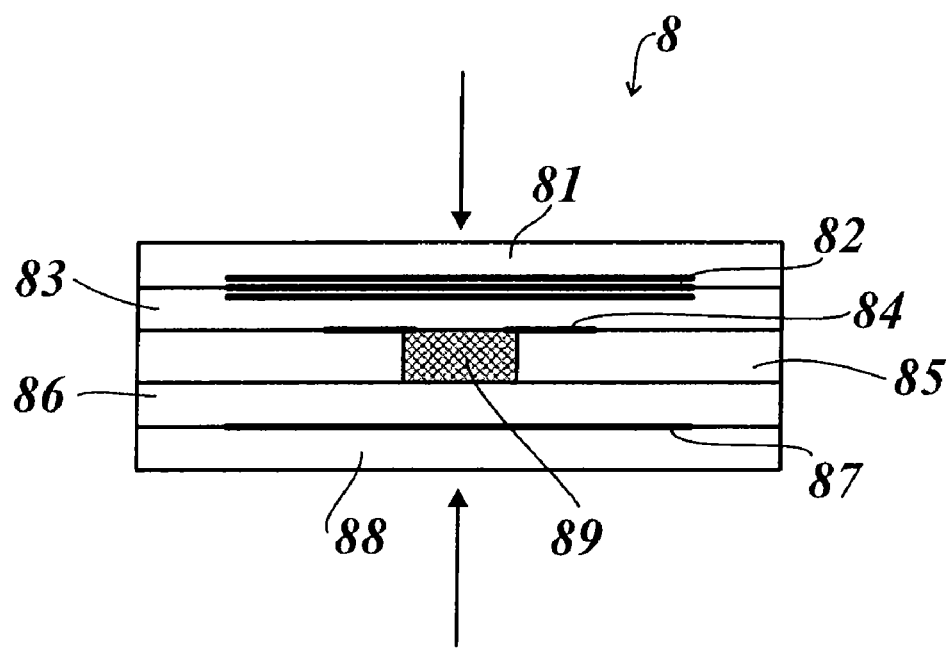
FIG. 6 shows a diagrammatic sectional view of a film element according to the invention for a further embodiment of the invention.

Reference will now be made to FIGS. 5 and 6 to describe further embodiments of the invention, in which first conductor structures for coupling in the near field and second conductor structures for coupling in the far field are provided in a film element.

FIG. 5 shows a film element 7 with a plurality of dielectric layers 71, 73, 75, 76 and 78, a plurality of electrically conductive layers 72, 74 and 77 and an electric circuit 79.

The dielectric layers 71 and 78 involve plastic films, preferably polycarbonate films of a thickness of between 12 and 100 μm.

The dielectric layers 72, 75 and 76 preferably also involve plastic films. It is however also possible for those dielectric layers to involve lacquer layers. In that case, to produce the film element 7, preferably firstly a core element consisting of the layers 72 through 77 is produced and then in a laminating process laminated in place between the layers 71 and 78 serving as a protective layer for protection against environmental influences for the core element.

It is however also possible for the film element 7 to be produced by laminating together two or more laminating films which each include one or more of the layers 71 through 78. Thus it is possible for example for a first laminating film to include the layers 71, 72, 73 and 74 and for a second laminating film to include the layers 75, 76, 77 and 78. In that case the layers 73 and 76 are preferably lacquer layers. Furthermore it is also possible for one or more layers 72 through 77 to be applied by means of a transfer film, for example a hot embossing film, to the layers 71 and/or 78 and for the resulting film bodies then to be joined together in a laminating process.

The electrically conductive layers 72, 74 and 77 involve layers of a metallic, electrically conducting material, for example aluminum, copper, silver, chromium, gold or a metal alloy, an electrically conductive polymer or a transparent, electrically conducting material, for example ITO.

In this case the electrically conductive layers 72, 74 and 77 are provided in partially shaped form to constitute first, second and third conductor structures respectively. In that case the first and third conductor structures afforded by the electrically conductive layers 72 and 77 are respectively in the form of a dipole antenna. The conductor structure provided by the electrically conductive layer 74 is of a configuration in the form of a coil or a strip, wherein the two ends of the two conductor structures are respectively connected to an associated electrode of the electric circuit 79. That therefore provides an antenna structure which comprises a coil-form or loop-form conductor structure galvanically connected to the electric circuit 79 and two dipole antenna structures which are galvanically separated from said conductor structure and which are arranged in parallel with that structure and which flank that structure on both sides. The first and third conductor structures are thus formed by antenna structures which are suitable for coupling in the far field of the RF signal and the second conductor structure is formed by an antenna structure suitable for coupling in the near field. By virtue of that arrangement it is possible for the components of the far field to be highly effectively coupled into the antenna structure designed for the near field and thus for the electric circuit to be activated from a distance of several meters.

The conductor structures provided by the layers 72, 74 and 77 substantially comprise copper, aluminum, silver or alloys thereof and are for example of the following dimensions:

First conductor structure (layer 72): layer thickness between 0.2 and 3 μm, shaped in the form of a dipole antenna of a typical length of 160 mm, corresponding to half a wavelength at 900 MHz, and of a width of between 3 and 30 mm, preferably 10 mm.

Second conductor structure (layer 74): layer thickness of less than 20 μm, shaped as a structure in coil form with a single turn and of a width for the conductor track of between 0.05 and 5 mm, and of an outside dimension of preferably 15×10 mm or 40×30 mm.

Third conductor structure (layer 77): layer thickness of less than 20 μm, preferably between 0.2 and 5 mm, shaped in the form of a dipole antenna of a length of between 15 and 250 mm and a conductor track width of between 2 and 15 mm.

In this case the two dipole antennas are arranged at an angular position of 90° relative to each other in the plane defined by the layers 72 and 77.

FIG. 6 shows a film element having a plurality of dielectric layers 81, 83, 85, 86 and 88, a plurality of electrically conductive layers 82, 84 and 87 and an electric circuit 89. In regard to the configuration of the layers 81, 83, 84, 85, 86, 87 and 88 attention is directed to the description relating to FIG. 5 in respect of the layers 71, 73, 74, 75, 76, 77 and 78 respectively. In that respect it is also possible to dispense with the layer 87.

The layer 82 involves a plurality of electrically conductive layers which are applied in mutually superposed relationship and which are for example respectively stamped out of a hot embossing film and applied in mutually superposed relationship. In this case each of those layers is in the form of an antenna and is respectively separated from the subjacent electrically conductive layer by a very thin dielectric layer formed for example by the adhesive layer of the transfer layer arrangement. That provides that two or more mutually closely adjacent antenna structures are provided over the layer 84 which is in the form of an antenna in coil or loop form, which antenna structures allow improved coupling-in of the near field. Thus the closely adjacent arrangement of the antenna structures achieves an increase in inductance due to the occurrence of interinductances in addition to the self-inductance of the antenna structure. The closely adjacently arranged antennas of the layer 82 are in this case respectively shaped in the form of a dipole antenna and are spaced from each other at between 2 and 10 µm.

A further embodiment of the invention will now be described with reference to FIGS. 7a through 7e.

To increase inductance it is provided here that two or more antenna structures provided in mutually juxtaposed relationship in a film layer are brought into mutually overlapping relationship by folding and subsequent gluing of the folded film layer.

Figure 7A:
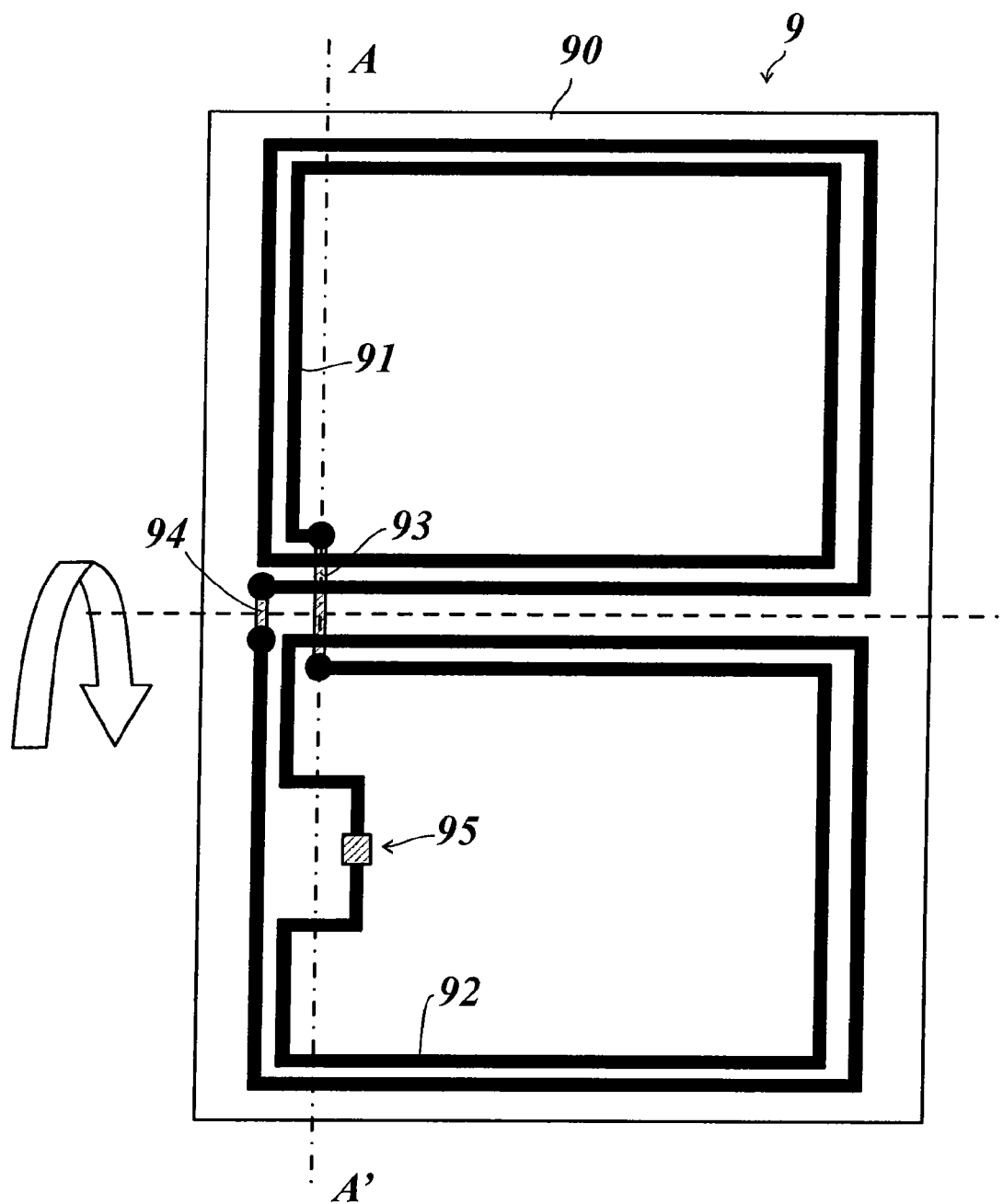
FIG. 7a shows a diagrammatic view of a film element according to the invention for a further embodiment of the invention.

FIG. 7a shows a film element 9 having a dielectric carrier substrate 90 and an electrically conductive layer which is provided on a first surface of the carrier substrate 90 and which is shaped in the form of a first antenna structure 91 in coil form and a second antenna structure 92 in coil form. The second antenna structure 92 comprises two conductor structures which are respectively shaped in coil form, wherein—as already illustrated with reference to FIGS. 3a and 3b—the one conductor structure is connected to a first electrode of the electric circuit 95 and the second conductor structure is connected to a second electrode of the electric circuit 95. Moreover provided in the dielectric carrier layer 90 are pass-through contactings, by way of which the two antenna structures 91 and 92 are electrically conductingly connected together by way of connecting elements 93 and 94 arranged on the opposite side of the dielectric carrier substrate 90.

Figure 7B:
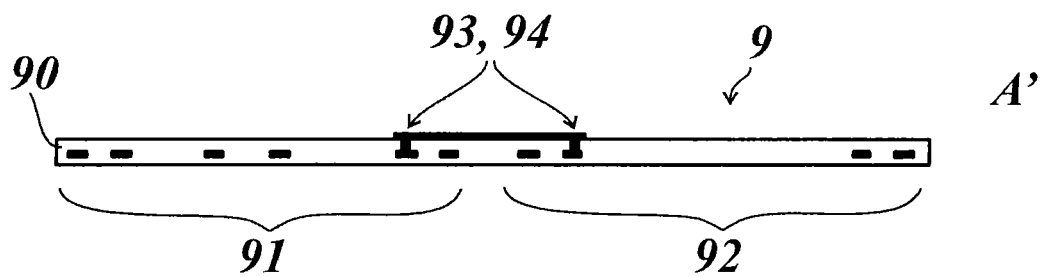
FIGS. 7b through 7d show diagrammatic sectional views to illustrate the manufacture of a film element according to the invention.

FIG. 7b shows a sectional view through the film element 9 along the section line A/A' and also shows the two antenna structures 91 and 92 as well as the connecting elements 93 and 94 which electrically conductively connect the two antenna structures 91 and 92 by way of pass-through contacting means.

Figure 7C:
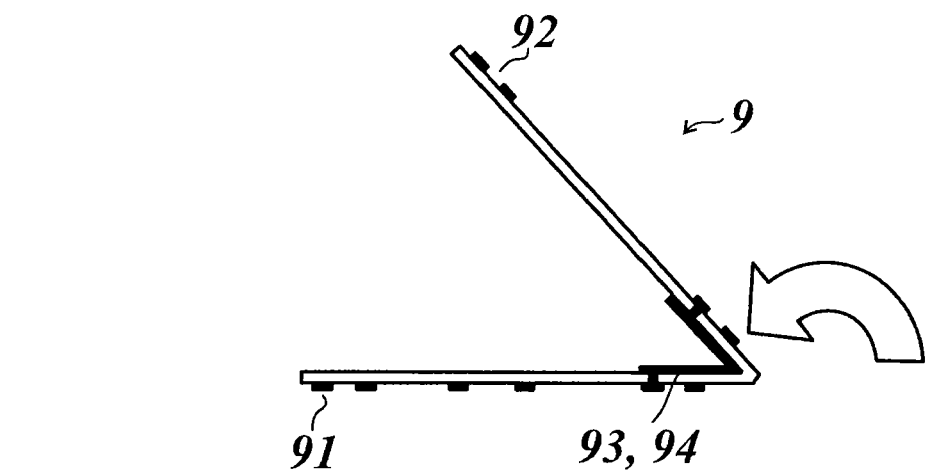

After production of the film element 9 shown in FIGS. 7a and 7b the film element 9 is folded along the dash-dotted line shown in FIG. 7a, as is also indicated in FIG. 7c. After or during the folding operation the two surfaces of the dielectric carrier substrate, which are resting of each other, are joined together by gluing by means of an additionally provided adhesive layer or by fusing the mutually superposed layers together partially or over the full surface area.

Figure 7D:
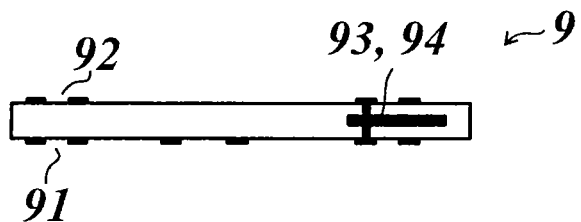
Figure 7E:
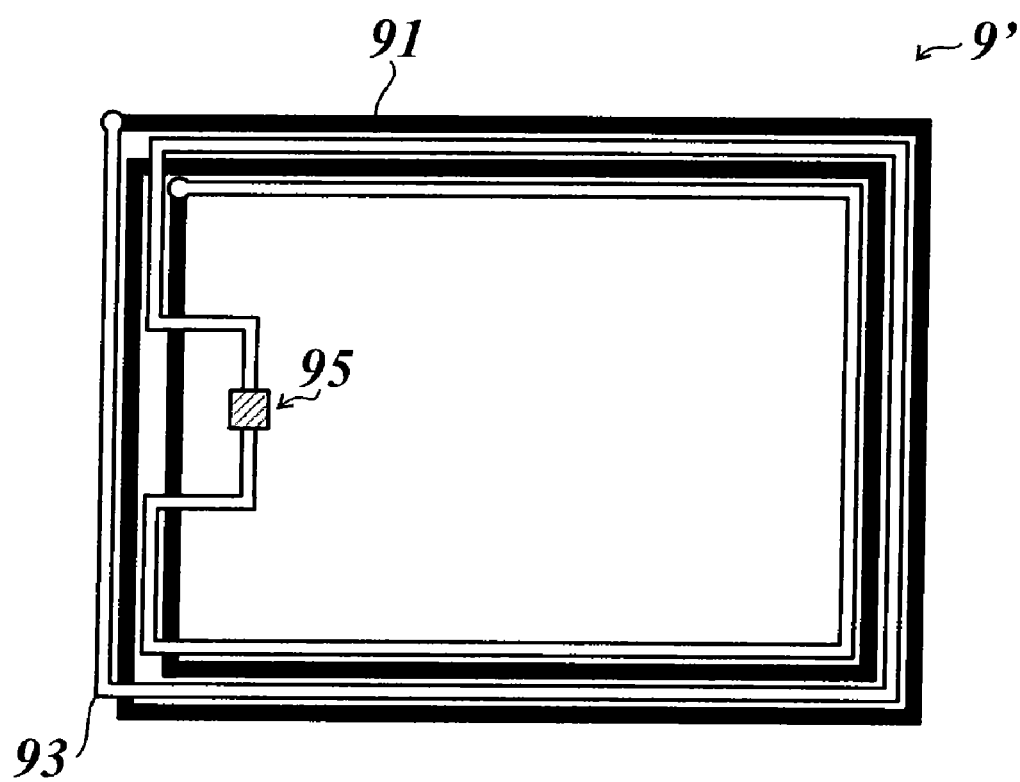
FIG. 7e shows a diagrammatic view of a film element according to the invention produced as shown in FIGS. 7b through 7d, and FIGS. 8a and 8b show diagrammatic views to illustrate the manufacture of a film element according to the invention for a further embodiment of the invention.

That then gives the film element 9' which is shown in FIGS. 7d and 7e and in which the antenna structures 91 and 92 are arranged at the two outward sides of a dielectric core provided by the folded and glued carrier layer 90. That permits particularly inexpensive and effective manufacture of a film element according to the invention.

Figure 8A:
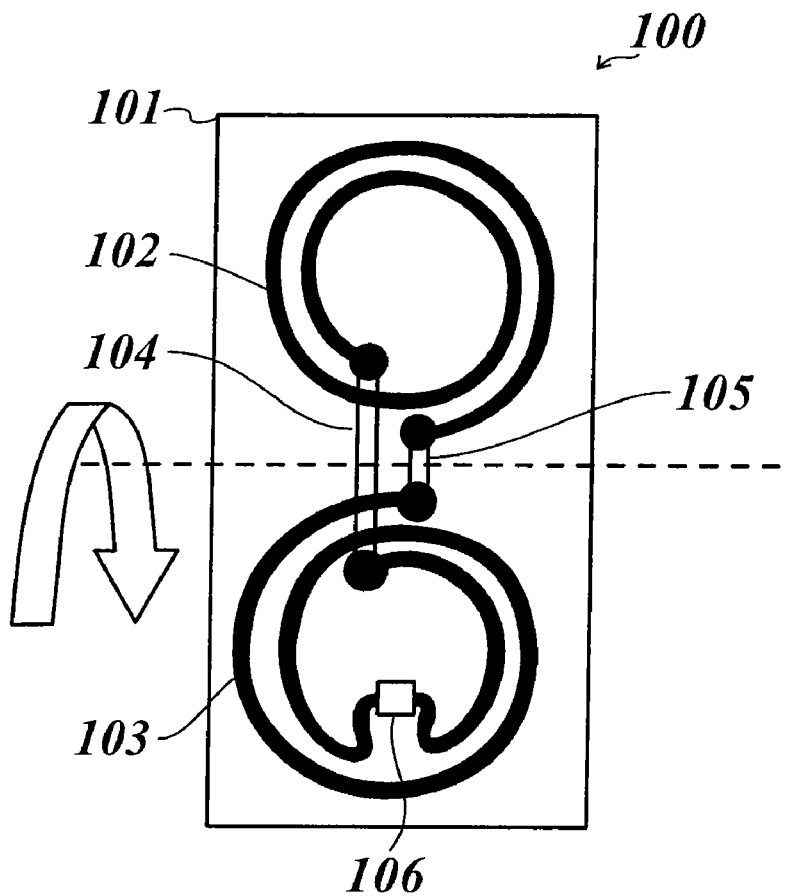
Figure 8B:
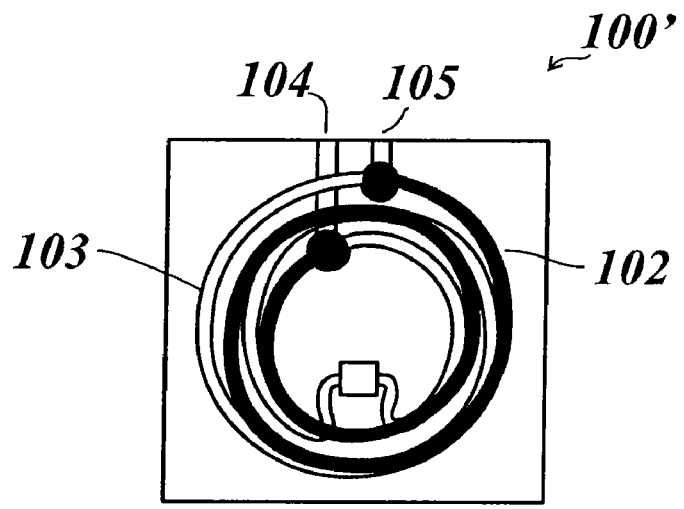

FIGS. 8a and 8b now show a further embodiment of the invention which is based on the principle illustrated in FIGS. 7a through 7e FIG. 8a shows a film element 100 comprising a dielectric carrier film and an electrically conductive layer which is provided on the dielectric carrier film and which is shaped in the form of the antenna structures 102 and 106 illustrated in FIG. 8a. The antenna structure 103 is here connected to the electric circuit 106. This arrangement also has pass-through contactings by way of which the antenna structures 102 and 103 are electrically conductively connected together by way of electric connecting elements 104 and 105. After production of the film element 100, for example by metalization of a polyester film over the full surface area by means of sputtering or vapor deposition, structuring of the metal layer by means of positive/negative etching, production of the pass-through contactings and production of the conductive connecting elements 104 and 105 for example by applying a conductive adhesive by printing in the configuration shown in FIG. 8a, the film element 100 is folded along the line indicated in FIG. 8a and the surfaces of the film element 100, which rest upon each other, are glued together. That gluing can be implemented by conductive adhesive which for example can also be used for production of the connecting elements 104 and 105. That affords the film element 100' shown in FIG. 8b, with the two mutually superposed antenna structures 102 and 103 which are galvanically connected together.

The invention claimed is:

1. A multi-layer film element comprising at least one flexible dielectric layer and one or more electrically conductive layers each comprising an electrically conductive material,
   wherein the layer thickness of the electrically conductive layers or the electrically conductive layer is respectively less than 20 µm and the multi-layer film element is a laminating film or a transfer film and the electrically conductive layer or the electrically conductive layers is or are shaped in pattern form for forming two or more conductor structures which are coupled together to provide an antenna structure galvanically connected to an electric circuit,
   wherein the film element has an optically active layer arranged in the film element in such a way that it at least partially covers over the two or more conductor structures, and
   wherein the electrically conductive layer comprises a reflection layer cooperating with the optically active layer.

2. A film element as set forth in claim 1, wherein the two or more conductor structures are shaped in two or more different conductive layers.

3. A film element as set forth in claim 1, wherein a first of the conductor structures is shaped in a first of the conductive layers and a second of the conductor structures is shaped in a second of the conductive layers and the dielectric layer is arranged between the first and second conductive layers.

4. A film element as set forth in claim 3, wherein the first and second conductor structures are coupled together by way of an electrically conductive pass-through contacting.

5. A film element as set forth in claim 4, wherein the first and second conductor structures are coupled together by way of an electrically conductive adhesive.

6. A film element as set forth in claim 3, wherein a third conductor structure is shaped in the first conductive layer and a first electrode of the electric circuit is galvanically connected to the first conductor structure and a second electrode of the electric circuit is galvanically connected to the third conductor structure.

7. A film element as set forth in claim 6, wherein the first, second and third conductor structures are respectively formed by a coil-form structure, the first conductor structure is coupled to the second conductor structure galvanically by way of a pass-through contacting and/or inductively/capacitively and the second conductor structure is coupled to the third conductor structure galvanically by way of a pass-through contacting and/or inductively/capacitively.

8. A film element as set forth in claim 7, wherein an end of the first conductor structure is galvanically connected by way of a pass- through contacting to an end of the second conductor structure and an end of the third conductor structure is galvanically connected by way of a pass-through contacting to the other end of the second conductor structure.

9. A film element as set forth in claim 3, wherein a first electrode of the electric circuit is galvanically connected to the first conductor structure and a second electrode of the electric circuit is galvanically connected to the second conductor structure and the first conductor structure is otherwise not galvanically connected to the second conductor structure.

10. A film element as set forth in claim 3, wherein the electric circuit is galvanically connected to the first conductor structure but not to the second conductor structure.

11. A film element as set forth in claim 10, wherein the first and second conductor structures are galvanically separated from each other and capacitively and/or inductively coupled together.

12. A film element as set forth in claim 11, wherein the first and second conductor structures are coupled together by way of capacitor plates.

13. A film element as set forth in claim 3, wherein the first and second conductor structures are respectively formed by a coil-form structure embracing a conductor track arranged in coil form.

14. A film element as set forth in claim 13, wherein the turns of the conductor track of each of the coil-form structures are spaced from each other at less than 0.5mm.

15. A film element as set forth in claim 14, wherein the turns of the conductor track of each of the coil-form structures are spaced from each other at less than 0.3mm.

16. A film element as set forth in claim 13, wherein the conductor track of the coil-form structures are respectively of a width of less than 5mm.

17. A film element as set forth in claim 3, wherein the first conductor structure and the second conductor structure are formed by two different antenna structures, selected from the group of an antenna coil, a dipole antenna, a bipole antenna, a loop antenna and a slot antenna.

18. A film element as set forth in claim 17, wherein the first conductor structure is formed by an antenna structure for coupling in the near field and the second conductor structure is formed by an antenna structure for coupling in the far field.

19. A film element as set forth in claim 17, wherein the film element has a third conductor structure, a further dielectric layer is provided between the second conductor structure and the third conductor structure, and the first conductor structure and the third conductor structure are respectively formed by a dipole antenna and the third conductor structure by a coil-form structure.

20. A film element as set forth in claim 1, wherein the two or more conductor structures are respectively formed by a conductor track having a first end and a second end, wherein the first ends of the conductor structures are connected to a first electrode of the electric circuit and the second ends of the conductor structures are connected to a second electrode of the electric circuit.

21. A film element as set forth in claim 20, wherein the two or more conductor structures are respectively formed by a conductor track forming a loop-shaped turn and the conductor track of the two or more conductor structures are shaped in the same conductive layer and are arranged in substantially mutually parallel relationship.

22. A film element as set forth in claim 1, wherein at least one of the electrically conductive layers is formed by a layer of a transfer layer portion of a transfer film, which is connected to the dielectric layer by means of an adhesive layer.

23. A film element as set forth in claim 1, wherein each of the conductive layers is of a layer thickness of less than 8μm.

24. A film element as set forth in claim 1, wherein the two or more conductor structures occupy an area of less than 90×50mm.

25. A film element as set forth in claim 1, wherein the film element has an optically active layer has having a microscopic or macroscopic surface relief having an optical-diffraction effect, or a surface relief in the form of lens structures, matt structures or blaze gratings, a thin-film layer, a liquid crystal layer or a layer having optically active pigments, wherein the optically active layer is arranged in the film element in such a way that it at least partially covers over two or more conductor structures.

26. A film element as set forth in claim 25, wherein a coding which can be optically read out is contained in the optically active layer.

27. A film element as set forth in claim 1, wherein the film element is in the form of a hot embossing film, comprising a carrier film and a transfer layer portion separated therefrom by a release layer and the dielectric layer and the electrically conductive layer or layers are part of the transfer layer portion.

28. A film element as set forth in claim 1, wherein the dielectric layer is of a layer thickness of less than 3μm.

29. A film element as set forth in claim 1, wherein the dielectric layer is formed by an adhesive layer.

30. A film element as set forth in claim 1, wherein the film element is of a layer thickness of less than 20μm.

31. A film element as set forth in claim 1, wherein the film element is in the form of a laminating film and the dielectric layer is of a layer thickness of between 12 and 42μm.

32. A process for the production of a multi-layer film element as set forth in claim 1, wherein the flexible dielectric layer is provided with the electrically conductive layer which is shaped in pattern form to form the two or more conductor structures, the dielectric layer is folded so that regions of the surface of the dielectric layer, that is not provided with the electrically conductive layer, face towards each other, and the mutually facing regions of the surface of the dielectric layer are connected together.

* * * * *